(12) United States Patent
Hospes

(10) Patent No.: US 7,299,037 B2
(45) Date of Patent: Nov. 20, 2007

(54) REMOTE CONTROL OVER MOBILE COMMUNICATION TERMINALS

(75) Inventor: Gerd-Joachim Hospes, Neu-Ulm (DE)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 10/804,554

(22) Filed: Mar. 19, 2004

(65) Prior Publication Data

US 2005/0208933 A1 Sep. 22, 2005

(51) Int. Cl.
- H04Q 7/20 (2006.01)
- H04Q 7/38 (2006.01)
- H04Q 7/32 (2006.01)

(52) U.S. Cl. ............ 455/419; 455/418; 455/420; 455/558; 455/550.1; 455/410; 455/411; 455/422.1

(58) Field of Classification Search ............ 455/419, 455/420, 418, 558, 550.1, 410, 411, 403, 455/422.1, 557, 404.1, 404.2, 414.1, 414.4, 455/466, 500, 517, 456.1, 456.6, 456.2, 445, 455/412.1, 412.2; 379/433.01, 433.09

See application file for complete search history.

(56) References Cited

U.S. PATENT DOCUMENTS

| 5,987,609 | A | 11/1999 | Hasebe | 713/200 |
| 6,542,730 | B1* | 4/2003 | Hosain | 455/410 |
| 6,662,023 | B1* | 12/2003 | Helle | 455/558 |
| 6,741,851 | B1* | 5/2004 | Lee et al. | 455/410 |
| 6,813,487 | B1* | 11/2004 | Trommelen | 455/404.1 |
| 2003/0013485 | A1* | 1/2003 | Jung | 455/557 |
| 2004/0142684 | A1* | 7/2004 | Ratert et al. | 455/420 |
| 2004/0203601 | A1* | 10/2004 | Morriss et al. | 455/411 |

FOREIGN PATENT DOCUMENTS

| EP | 1 170 969 | 1/2002 |
| JP | 11177682 | * 7/1999 |

* cited by examiner

Primary Examiner—Keith Ferguson
(74) Attorney, Agent, or Firm—Perman & Green, LLP

(57) ABSTRACT

Mobile communication terminals in a wireless communication network with identical (DUAL) SIM cards are provided with means for remotely switching of either of the terminals.

33 Claims, 5 Drawing Sheets

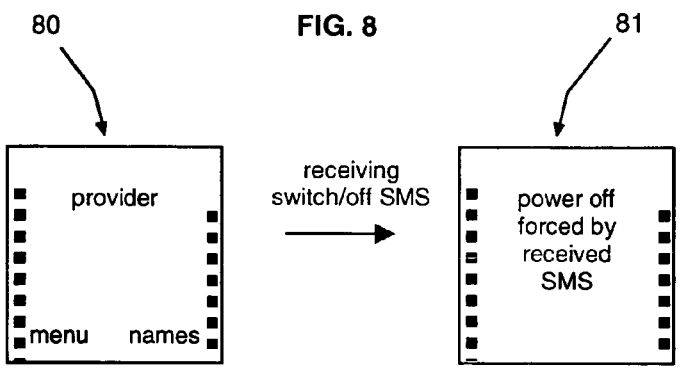
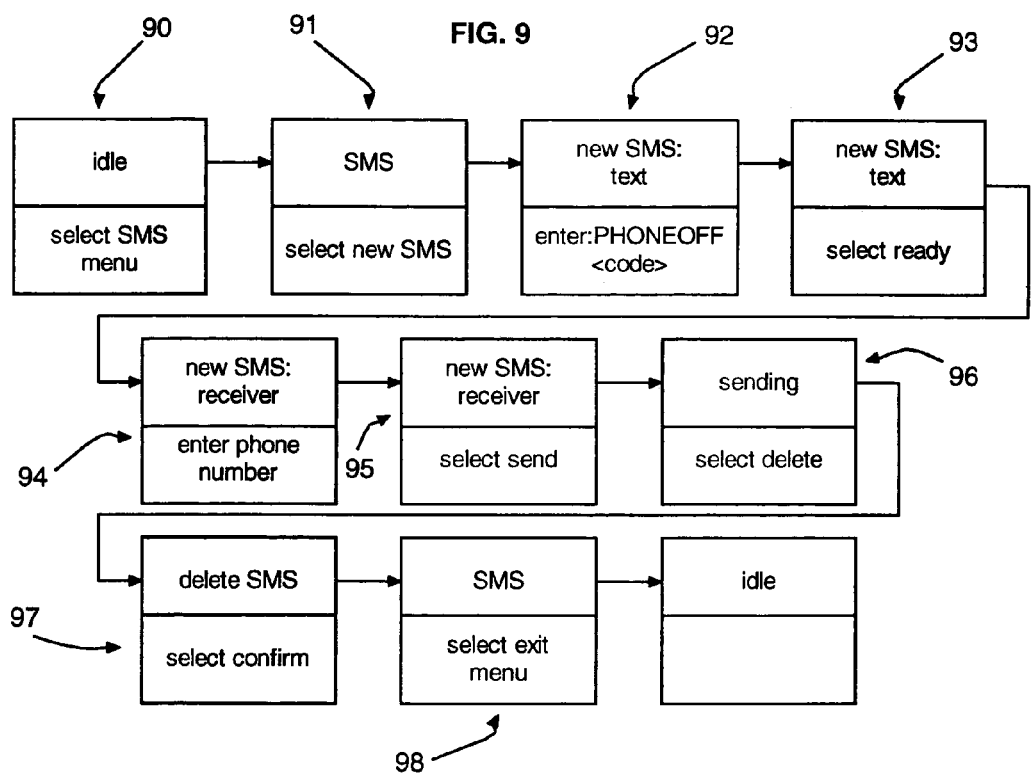

REMOTE CONTROL OVER MOBILE COMMUNICATION TERMINALS

The present invention relates to mobile communication terminals and to a method of remotely controlling mobile communication terminals.

BACKGROUND ART

Nowadays mobile telephone systems are known among them the well-known GSM system. The mobile phones used in this system comprise a SIM card (Subscriber Identity Module) for controlling them, the SIM card containing relevant information, such as subscriber details, security information, memory for a personal directory of numbers, and data that identify the user to the network provider and allows the access to the wireless communication network, such as a GSM or a G3 network. A SIM card has associated the IMSI and the MSISDN, IMSI (International Mobile Subscriber Identity) being a unique number for identifying a subscriber in the network and MSISDN (Mobile Station ISDN number) being the phone number.

Dual SIM cards are known in the GSM system. Dual SIM cards are a utility that allows GSM users to have two SIM cards with the same number, i.e. with the same IMSI and MSISDN. The dual SIM can be used independently on two mobile phones. The idea is that either one of the phones is in use.

Mobile phones regularly contact the network for a location update, so that the network is informed in which cell of the cellular network the phone is presently located and can be contacted.

The use of the dual SIM cards has a drawback in that, when inadvertently both mobile phones are in use, the last location updated mobile phone is the only one receiving the next call, so there is an undefined situation. If a user has left an active phone e.g. back at home, and is away from home with the second active phone, a call would be received on the phone with the most recent location update. This could well be the unattended phone back home, and the user could at least temporarily not be reached by phone.

EP 1 170 969 discloses a method and apparatus for remotely switching into a secure mode a mobile electronics device when it has been lost, stolen or misused in order to prevent its use except to help the owner find it. This can be achieved using a control message, for example, via a Short Messaging System (SMS).

This method allows to remotely lock a mobile phone for user access when it has been lost but doesn't solve the drawback of the dual SIM cards because the mobile phone needs to be active and subscribed to the network to help the user to find it.

U.S. Pat. No. 5,987,609 discloses a system for remotely securing or locking a stolen wireless information device via an email message with an attached password to the device. The owner of an information device specifies a password beforehand, which is stored in a memory. When an electronic mail is received from another information device through a wireless telephone facility of the information device, a password attached to the email message is checked with the password stored in the memory. When the password match occurs, a security process is executed.

DISCLOSURE OF THE INVENTION

On this background, it is an object of the present invention to provide a mobile communication terminal of the kind referred to initially, which can be remotely controlled to solve the problem associated with the use of dual SIM cards described above.

This object is achieved in accordance with claim 1 by providing a terminal for use in a wireless communication network, the mobile communication terminal comprising a memory containing a first switch-off code of the mobile communication terminal, and a processor unit controlling the status of the mobile terminal. The mobile terminal is adapted for receiving a remote switch-off signal containing a second switch-off code via the communication network, and the processor unit is adapted for switching off the terminal when the first switch-off code stored in the memory and the second switch-off code contained in the switch-off signal are identical.

The mobile communication terminal according to the present invention provides a number of advantages. It allows to switch off the not-in-use mobile terminal in the case of dual SIM cards, avoiding the drawback cited above. Moreover, it is possible to switch off the mobile communication terminal if said terminal has been lost or stolen.

It is clear that the invention only works if the first switch-off code is stored in the memory of the mobile communication terminal. In some cases, deleting this first switch-off code prevents misuse. If no first switch-off code is set the mobile communication terminal should reject the switch-off signal.

Preferably, the terminal is provided with a control module which may comprise a remote switch-off module that receives the remote switch-off signal in the form of a remote message signal via the communication network from an owner of the mobile communication terminal, a remote message signal verification module for determining by means of a parameter for identifying the remote switch-off signal if a remote message signal is a switch-off signal or a normal message signal and for comparing the first switch-off code and the second switch-off code, a terminal switch-off module which runs a switch-off process, and a response address module for providing a switch-off confirmation message signal to the owner before the terminal switches completely off or a non-switch-off confirmation message signal to the owner if an error occurs.

The control module has the function of controlling all the operations related to the switching off of the terminal.

The remote switch-off signal advantageously comprises a parameter for identifying it as a remote switch-off signal, and the second switch-off code, the parameter for identifying the remote switch-off signal being a word, such as "PHONEOFF".

With this parameter the remote message signal verification module can determine if the remote switch-off signal is really a remote switch-off signal. Next, this module compares the first switch-off code stored in the memory and the second switch-off code contained in the switch-off signal for determining if the switch-off codes are identical and switching off the first mobile communication terminal.

In one embodiment, the remote message signal verification module deletes the first switch-off code stored in the memory of the terminal after a predetermined number of consecutive remote switch-off signals having a second switch-off code different from the first switch-off code.

This feature causes that the terminal counts erroneous tries. After the predetermined number of consecutive remote switch-off signals with a wrong switch-off code the module deletes the first switch-off code stored in the terminal to prevent any other tries. This would avoid the risk that someone obtains the first switch-off code just by trying different codes.

The remote switch-off signal can further comprise a response telephone number or a response email address, which are checked by the response address module.

With a response telephone number or a response email address is possible to send a switch-off signal from different devices because the switch-off confirmation message signal can be sent to a number or address different from that of the sender. Also, it allows to use a borrowed mobile phone or a computer connected to internet. For example, if the internet address is chosen the switch-off signal should contain a response address because currently most SMS service providers do not forward a response. The response address can also be used if the switch-off signal is sent from a borrowed mobile but the response should be sent to an email address or another SMS terminal, e.g. an ISDN phone, a mobile phone, a PDA with GSM receiving unit or even a gateway translating SMS to fax or voice.

Preferably, the switch-off confirmation message signal comprises a terminal EOTD location that allows to locate a lost or stolen terminal. The location should not be added to the negative response to prevent misuse by sending the switch-off signal with a random number to get the location of the terminal.

According to another embodiment of the invention, the remote switch-off signal is a message in Short Messaging System (SMS) format. So, the remote switch-off signal is a switch-off SMS that is transferred as normal readable SMS text.

The mobile communication terminal may further comprise a SIM card containing a subscriber identity, which can be the same subscriber identity contained in at least another SIM card. This is a case of dual SIM cards.

According to another aspect, the present invention provides a method for remotely switching off a first mobile communication terminal having a given subscriber identity associated therewith, comprising the steps of (A) sending a remote switch-off signal via a wireless communication network to the first mobile communication terminal, (B) receiving the remote switch-off signal on the first mobile communication terminal, (C) verifying the remote switch-off signal on the first mobile communication terminal, and (D) if the verification in step (C) is positive then switching off the first mobile communication terminal.

In this way a method is achieved for switching remotely off a mobile communication terminal which allows to solve the drawback cited in the case of a dual SIM cards. Moreover, it allows to switch off a lost or stolen mobile terminal.

The method can comprise a step (E) before step (A) comprising switching off a second mobile communication terminal having associated therewith the same subscriber identity as the first mobile communication terminal, and a step (F) after step (D) comprising switching on the second mobile communication terminal; and wherein in step (A) the remote switch-off signal is sent from a third mobile communication terminal having associated therewith a subscriber identity different from that of the first and the second mobile communication terminals.

This embodiment allows to switch off a mobile terminal in the case of the dual SIM cards, with a call from a terminal having a different SIM card (subscriber identity).

Alternatively, the method can further comprise a step (G) before step (A) comprising switching off a second mobile communication terminal having associated therewith the same subscriber identity as the first mobile communication terminal, and a step (H) after step (D) comprising switching on the second mobile communication terminal, and wherein in step (A) the remote switch-off signal is sent from a computer through an internet gateway.

Preferably, step (C) comprises the sub-steps of (C.1) recognizing said parameter for identifying a remote switch-off signal, and (C.2) comparing a first switch-off code stored in a memory of the first mobile communication terminal and the second switch-off code contained in the remote switch-off signal.

In one embodiment, the method further comprises, if the verification in step (C) is positive, a step (I; I.1) between steps (C) and (D) comprising sending a switch-off confirmation message signal before the terminal switches completely off.

In one embodiment, the method further comprises, if the verification in step (C) is negative, a step (J; J.1) between steps (C) and (D) comprising sending a non-switch-off confirmation message signal.

The remote switch-off signal can comprise a response telephone number and step (C) can further comprise a sub-step (C.3; C.4) comprising detecting the response telephone number.

In an alternative embodiment, the remote switch-off signal can comprise a response email address and step (C) can further comprise a sub-step (C.3; C.4) comprising detecting the response email address.

According to yet another aspect of the invention, there is provided a method for remotely switching off a first mobile communication terminal with a given subscriber identity associated therewith, comprising the steps of (K) calling a predetermined telephone number of a wireless communication network provider from a second mobile communication terminal having associated therewith the same subscriber identity that said first mobile communication terminal, (L) cause said network provider to verify if the first mobile communication terminal is switched on, (M) if the verification in step (B) is positive, cause said network provider to send a remote switch-off signal to the first mobile communication terminal, and (N) switching off the first mobile communication terminal upon receipt of the remote switch-off signal.

The method can further comprise a step (O) between steps (K) and (L) comprising switching off the second mobile communication terminal during a period of time.

The method can further comprise a step (P) between steps (K) and (L) of storing a unique code associated to the second mobile communication terminal and wherein step (L) comprises the sub-steps of (L.1) updating the first mobile communication terminal in the wireless communication terminal, (L.2) obtaining the subscriber identity and a unique code of the first mobile communication terminal, and (L.3) recognizing that the first mobile communication terminal has the same subscriber identity but different unique code that-the second mobile communication terminal.

The unique code can be the IMEI associated to each mobile phone.

BRIEF DESCRIPTION OF THE DRAWINGS

In the following detailed portion of the present description, the invention will be explained in more detail with reference to the exemplary embodiments shown in the drawings, in which:

FIG. 8 illustrates a display when a remote switch-off signal is received by the mobile phone of FIG. 1, FIG. 9 is a flow chart illustrating the generation of a switch-off signal by means of a menu structure of the mobile phone of FIG. 1.

DETAILED DESCRIPTION

In the following detailed description, embodiments of a mobile communication terminal according to the invention, in the form of a hand portable phone, preferably a cellular/mobile phone, will be described.

Figure 1:
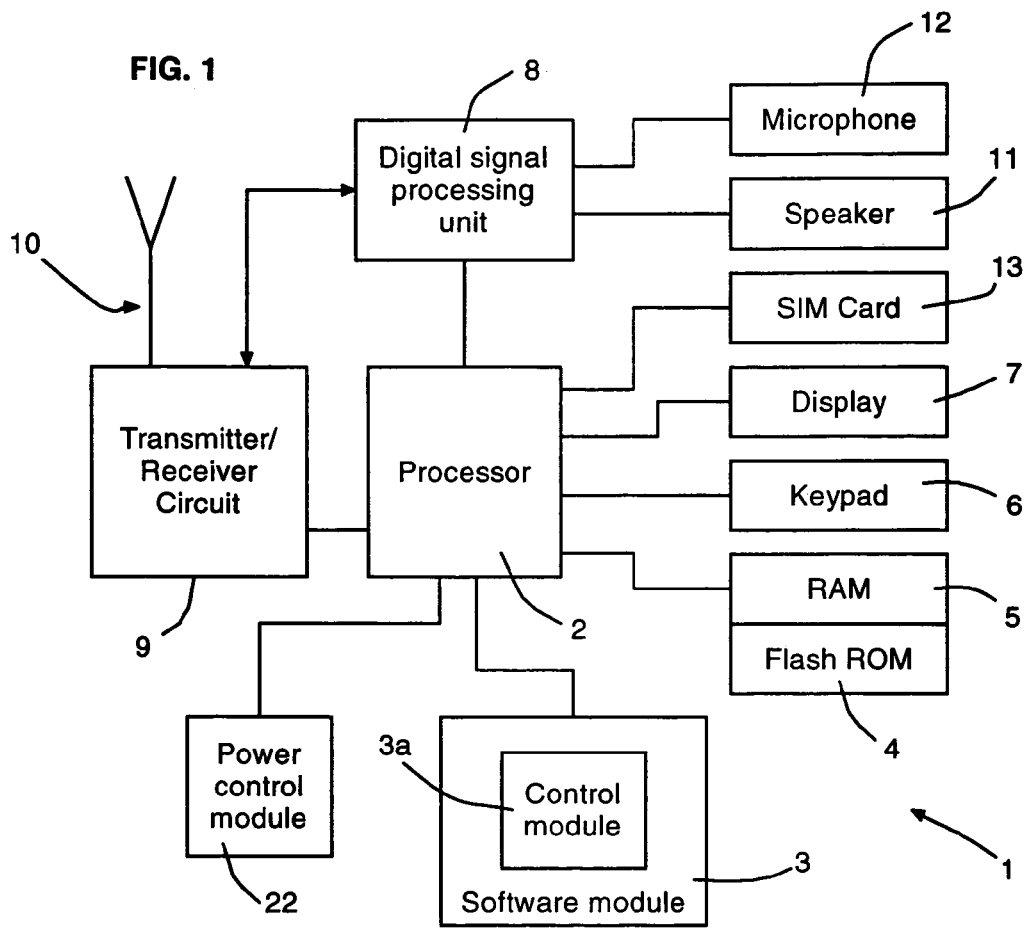
FIG. 1 is a block diagram illustrating the general architecture of a mobile phone in accordance with the present invention.

FIG. 1 illustrates in block diagram form the general architecture of the mobile phone constructed in accordance with the present invention. The mobile phone 1 includes a processor 2 for controlling the operation of the mobile phone 1, said processor 2 being connected to a power control module 22 for controlling the power supply to the mobile phone 1. A software module 3 which comprises a control module 3a (FIG. 2) calls the power control module 22 for controlling the remote switched off of the mobile phone 1. The power control module 22 ensures, when called, that the mobile phone 1 is correctly powered down by saving current data, unsubscribing from the network and waiting for all modules to shut down until it reduces the power of specific modules (e.g. HF module, display) and drives the processor 2 in a mode where only the ON/OFF key is tracked. The mobile phone 1 also includes a program memory (Flash ROM 4) for storing programs used by the mobile phone 1 and a Random Access Memory (RAM 5) which stores a first switch-off code. Input/output circuits interface the processor 2 with a keypad 6, a display 7, digital signal processing unit 8, and the receiver/transmitter circuit 9. The receiver/transmitter circuit 9 is connected to an internal antenna 10. The digital signal processing circuit 8 provides analog audio outputs to a speaker 11 and accepts analog audio inputs from a microphone 12. The processor 2 also forms the interface to the peripheral units of the apparatus, including a SIM card 13, as well as power supply, etc.

The SIM (subscriber identity module) card 13 inserted in the mobile phone 1 produces a subscriber's identity (IMSI) which is allocated to a directory number (Mobile Station International ISDN number—MSISDN). IMSI is an acronym for International Mobile Subscriber Identity and is a unique number that is associated with all GSM network mobile phone users. IMSI is fifteen digits long: the first three digits are the country code (MCC), the next two are the network code (MNC) and the remaining ten digits are the unique subscriber number within the network's customer base. MSISDN is the phone number. Information on IMSI and MSISDN is stored, together with other information relating to the subscriber (the owner of the mobile phone), in a home database (Home Location Register—HLR) with the operator of a communication network including the subscriber.

Figure 2:
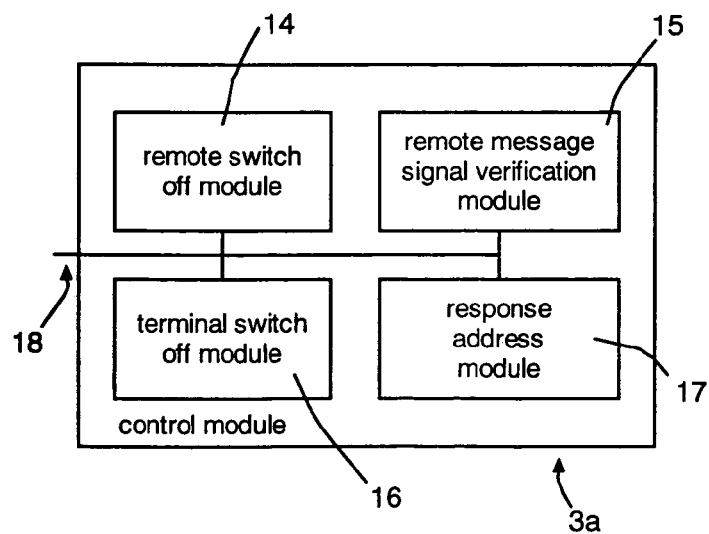
FIG. 2 is a block diagram illustrating the control module of the mobile phone of FIG. 1.

FIG. 2 illustrates in more detail the control module 3a of the mobile phone 1. The control module 3a comprises a remote switch-off module 14 for receiving a remote switch-off signal in the form of a remote message signal via a wireless communication network, such as the GSM network; a remote message signal verification module 15 for determining if the remote message signal is a switch-off signal or a normal message signal, and for comparing the first switch-off code stored in the memory 5 of the mobile phone 1 and a second switch-off code contained in the remote switch-off signal; a terminal switch-off module 16 for switching off the mobile phone 1 running a switch-off process; and a response address module 17 for detecting if the remote switch-off signal contains a response address (e.g., a response telephone number or a response email address) and for providing a switch-off confirmation message signal to the owner before the mobile phone 1 switches completely off or a non-switch-off confirmation message signal to the owner if an error occurs. All modules are connected by means of a data bus 18 to the processor 2.

Henceforth a remote switch-off signal is a message in Short Messaging System (SMS) format that can have any of following structures:

A: <parameter> <switch-off code>

B: <parameter> <switch-off code> <response-phone-number>

C: <parameter> <switch-off code> <response-email-address> where <parameter> is a word for identifying a switch-off SMS, for example, PHONEOFF, the <switch-off code> is, for example, a 6 digit code, <response-phone-number> is a telephone number to which a switch-off confirmation message signal has to be sent, and <response-email-address> is an email address to which a switch-off confirmation message signal has to be sent.

Examples of these three structures are:

A: PHONEOFF 123456

B: PHONEOFF 123456+491711234567

C: PHONEOFF 123456 my.adddress@email.service.com

Switch-off SMS must not be stored in an inbox of the mobile phone 1 and must not be stored in an outbox of a sending phone 20 (FIG. 3), in order to avoid unauthorised access to this information.

Figure 3:
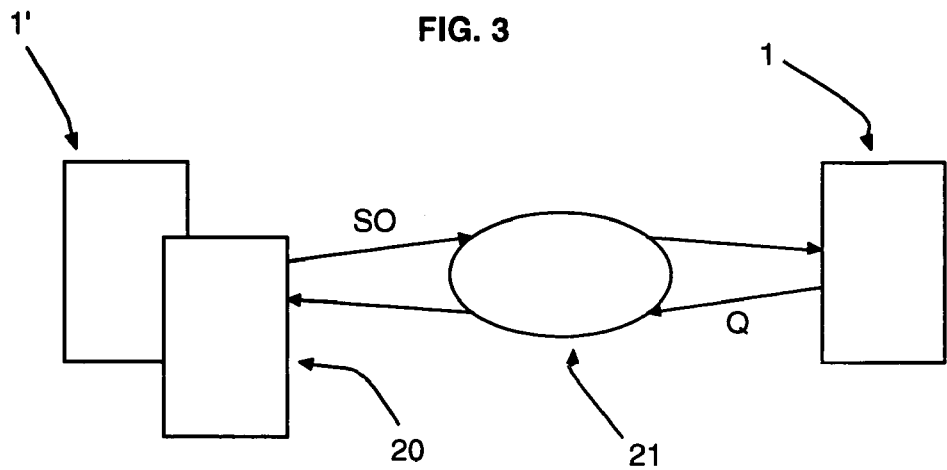
FIG. 3 illustrates a first preferred embodiment for switching off the mobile phone of FIG. 1 according to the invention.

FIG. 3 illustrates a first preferred embodiment for remotely switching off, the mobile phone 1, according to the invention, in a situation of dual SIM cards. The figure shows a first mobile phone 1 with a given subscriber identity associated therewith, a second mobile phone 1' having the same subscriber identity associated therewith, and a third mobile phone 20 having a different subscriber identity associated therewith. Consequently, the first and the second mobiles phones have identical IMSI and MSISDN, which are different in the third mobile phone.

Firstly, the second mobile phone 1' must be switched off (step E) to prevent an undefined situation arising when both mobile phones are in use, because the last location updated mobile phone is the only one receiving the next call. With the second phone 1' switched off, the user (owner) sends (step A) a switch-off SMS SO to the first mobile phone 1 via the GSM network 21 from the third mobile phone 20 (for example, a borrowed mobile phone). The first mobile phone 1 receives (step B) the switch-off SMS SO by means of the control module 3a, more precisely the remote switch-off module 14, and verifies it (step C) by means of the remote message signal verification module 15. Said verification will be described in detail below with reference to FIG. 7. Here it is assumed that the verification done by the remote message signal verification module 15 is positive. The first mobile phone 1 sends the switch-off confirmation message signal Q via the GSM network 21 before the phone 1 switches completely off, to inform the user that it will be switched off. Depending on the result of the response address module 17, this message can be sent to the third mobile phone 20 (step I.1) if the switch-off SMS SO does not have (NO in sub-step C.3) a response telephone number or a response email address, or to an SMS terminal (step I), such as an ISDN phone, a mobile phone, a PDA with GSM receiving unit or even a gateway translating SMS to fax or voice, if a response telephone number is detected (YES in sub-step C.3), or to an email address (step I) if a response email address is detected (YES in sub-step C.3). An example of a switch-off confirmation message signal Q can be "Mobile phone +491711234567 has been switched off". Next, the first mobile phone is switched off (step D) by the terminal switch-off module, and the user, upon receipt of the switch-off confirmation message signal, switches on (step F) the second mobile phone 1 for using it.

The switch off sequence on the receiving phone display 7 can be seen in FIG. 8, which will be described in detail below.

In the case that the verification (step C) done by the remote message signal verification module 15 is negative, it can be because the switch-off SMS is not a switch-off signal or because the second switch-off code contained in the switch-off SMS SO is different from the first switch-off code stored in the memory 5 of the mobile phone 1. In the first case, the switch-off SMS will be handled as a normal SMS but in the second case the first mobile phone 1 sends a non-switch-off confirmation message signal Q via the GSM network 21 to the user to inform him/her that the first mobile phone 1 won't be switched off. Depending on the result of the response address module 17, this message Q can be sent to the third mobile phone 20 (step J.1) if the switch-off SMS SO does not have a response telephone number or a response email address (NO in sub-step C.4), or to an SMS terminal (step J), if a response telephone number is detected (YES in sub-step C.4), or to an email address (step J) if a response email address is detected (YES in sub-step C.4). An example of a non-switch-off confirmation message signal Q can be "Cannot run the procedure. Please check switch-off code".

To raise the security even more it might be convenient that the first mobile phone 1 receiving the switch-off SMS SO counts erroneous tries. For example, after the third switch-off SMS with a wrong switch-off code it should delete the stored switch-off code to prevent any other tries. This would prevent that someone obtains the switch-off security code just by trying different switch-off codes. Also, it is not necessary to enter a special off mode after receiving the switch-off SMS. Switching on the mobile phone is only possible if a PIN associated to the SIM card is entered correctly. As usual the mobile phone will enter a especial mode if this PIN is entered wrongly three times in sequence. This mode can then only be switched on if the PIN2 is entered.

Figure 4:
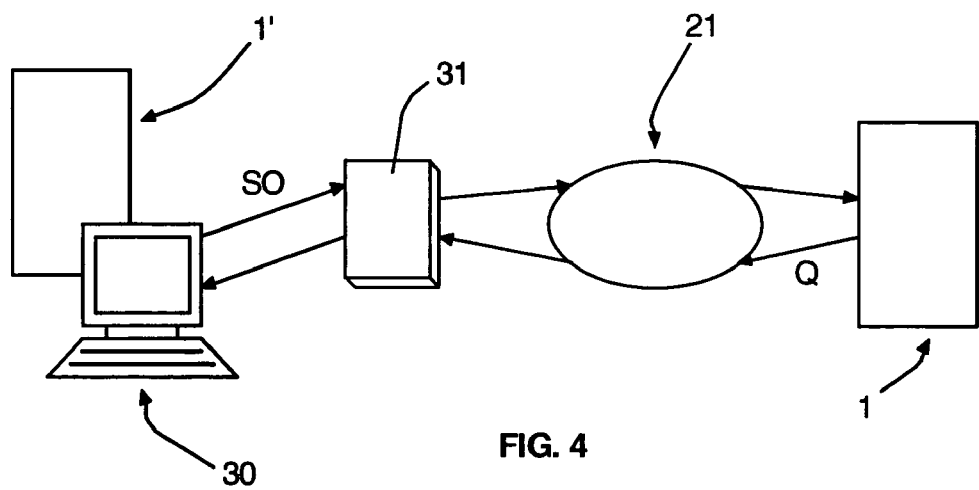
FIG. 4 illustrates a second preferred embodiment for switching off the mobile phone of FIG. 1.

FIG. 4 illustrates a second preferred embodiment for remotely switching off the mobile phone 1, according to the invention, in a situation of dual SIM cards. The figure shows a first mobile phone 1 with a given subscriber identity associated therewith and a second mobile phone 1' having the same subscriber identity associated therewith.

The second mobile phone 1' must firstly be switched off (step E) for preventing an undefined situation arising when both mobile phones are in use, because the last location updated mobile phone is the only one receiving the next call. With the second phone 1' switched off, the user (owner) sends (step A) a switch-off SMS SO to the first mobile phone 1 via the GSM network 21 from a computer 30 through an internet SMS gateway 31. The first mobile phone 1 receives (step B) the switch-off SMS SO by means of the control module 3a, more precisely the remote switch-off module 14, and verifies (step C) it by means of the remote message signal verification module 15. Said verification will be described in detail below with reference to FIG. 7. Here it is assumed that the verification done by the remote message signal verification module 15 is positive. The first mobile phone 1 sends the switch-off confirmation message signal Q via the GSM network 21 before the phone 1 switches completely off to inform the user that it will be switched off. In this case, the switch-off SMS SO should contain a response telephone number or a response email address because currently most SMS service providers do not forward a response. Also, depending on the result of the response address module 17, the message Q can be sent to an SMS terminal (step I), if a response telephone number is detected (YES in sub-step C.3), or to an email address (step I) if a response email address is detected (YES in sub-step C.3). Next, the first mobile phone is switched off (step D) by means of the terminal switch-off module 16 and the user, upon receipt of the switch-off confirmation message signal, switches on (step F) the second mobile phone 1 for using it.

In the case that the verification (step C) done by the remote message signal verification module 15 is negative, it can be because the switch-off SMS is not a switch-off signal or because the second code contained in the switch-off SMS SO is different from the first switch-off code stored in the memory 5 of the mobile phone 1. In the first case, the switch-off SMS SO will be handled as a normal SMS but in the second case the first mobile phone 1 sends a non-switch-off confirmation message signal Q via the GSM network 21 to the user to inform him/her that the first mobile phone 1 won't be switched off. In this case, the switch-off SMS SO should contain a response telephone number or a response email address because currently most SMS service providers do not forward a response. Depending on the result of the response address module 17, the message Q can also be sent to an SMS terminal (step J), if a response telephone number is detected (YES in sub-step C.4), or to an email address (step J) if a response email address is detected (YES in sub-step C.4).

Also in this case, to raise the security even more it might be convenient that the first mobile phone 1 receiving the switch-off SMS SO counts erroneous tries.

Figure 5:
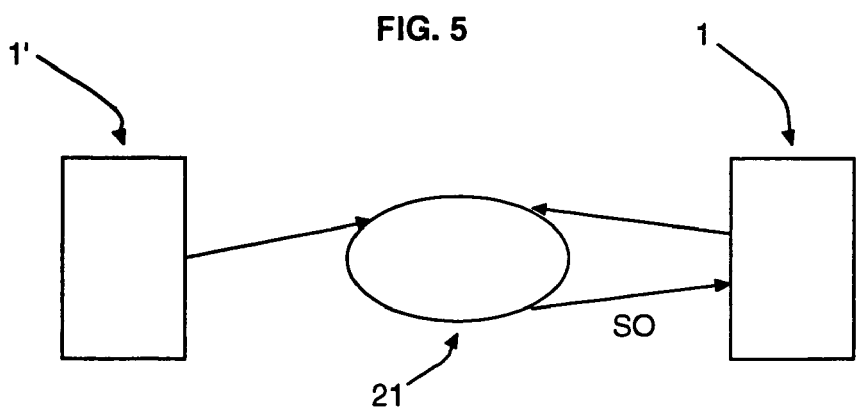
FIG. 5 illustrates a third preferred embodiment for switching off the mobile phone of FIG. 1.

FIG. 5 illustrates a third preferred embodiment for remotely switching off the mobile phone 1, according to the invention, in a situation of dual SIM cards. The figure shows a first mobile phone 1 with a given subscriber identity associated therewith and a second mobile phone 1' having the same subscriber identity associated therewith.

In this third preferred embodiment, no borrowed mobile phones or computers are needed because the process is supported by the network provider. The second mobile phone 1' is switched on and a predetermined telephone number of the network 21 provider is called (step K) to define the second mobile phone 1' as the active phone, the network provider storing (step P) the IMEI of said second mobile phone 1'. After this, when the first mobile phone 1 updates (step L.1) itself in the communication network 21 and the network provider obtains (step L.2) its subscriber identity and its IMEI, the provider recognises (step L.3) that the first mobile phone 1 has the same subscriber identity but different IMEI from of the second mobile phone 1'. Then, the network provider causes the switch off (steps M and N) of the first mobile phone 1 to prevent the undefined situation arising when both mobile phones are in use. This switch off can be done by means of a switch-off SMS SO, but other ways might also be possible.

With reference to FIG. 5 another embodiment is possible. The mobile phone 1' is switched on and a predetermined telephone number of the network 21 provider is called (step K). After this call the second mobile phone 1' is switched off (step 0) by the user. The network provider sends (M) a switch-off SMS SO to the first mobile phone 1 to switch it off (N). This message is received by the first mobile phone 1 because the second mobile phone 1' is not operative. Later on (about after 30 minutes) the user can switch on the second mobile phone 1' and check the switch-off confirmation message signal Q. It can be noted that in the two embodiments described with reference to FIG. 5, the switching off of the first mobile phone 1 is triggered by the call of the second mobile phone 1' to the network provider.

Moreover, in FIG. 3, FIG. 4 and FIG. 5, the switch-off confirmation message signal Q can contain, for example, acknowledge text, phone number or EOTD location. For the EOTD location, the mobile phones must comprise an EOTD application to determine their geographical position. The network is also set up to perform EOTD through an application server connected to the mobile call center. The location should not be added to the negative response to prevent misuse by sending the switch-off signal with a random number to get the location of the mobile phone.

Figure 6:
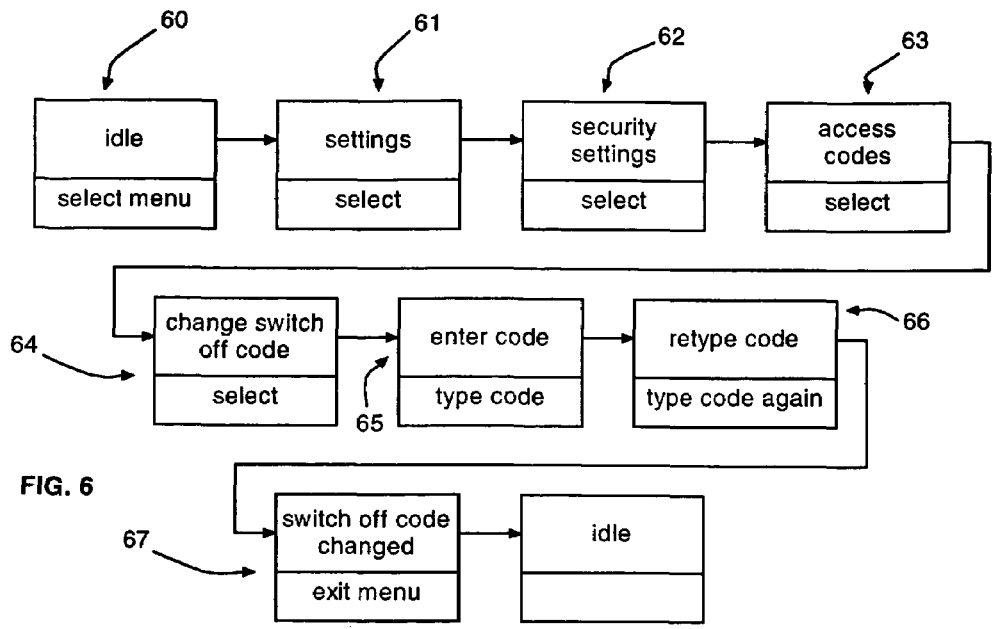
FIG. 6 is a flow chart illustrating the change of the switch-off code by means of a menu structure of the mobile phone of FIG. 1.

FIG. 6 is a flow chart illustrating the change of the first switch-off code stored in the memory of the mobile phone 1 by means of a menu structure. The user must access 60 the menu of the mobile phone 1 and select 61 the menu structure of the "settings". In this menu structure, the user must select 62 the "security settings" menu item and later select 63 the "access codes" menu item. With this selection the user can access 64 the "change switch-off code" menu item and enter 65 the new code typing it with the keypad 6. For security reasons, the user must retype 66 the code and exit 67 the menu in order to change the first switch-off code. Also for security reasons, it can be foreseen that the user has to enter the current code before being able to enter 65 a new code.

The switch-off code stored in the memory of the mobile phone should also be deleted if the general reset is performed where all user defined settings are set to manufacture predefined values.

Figure 7:
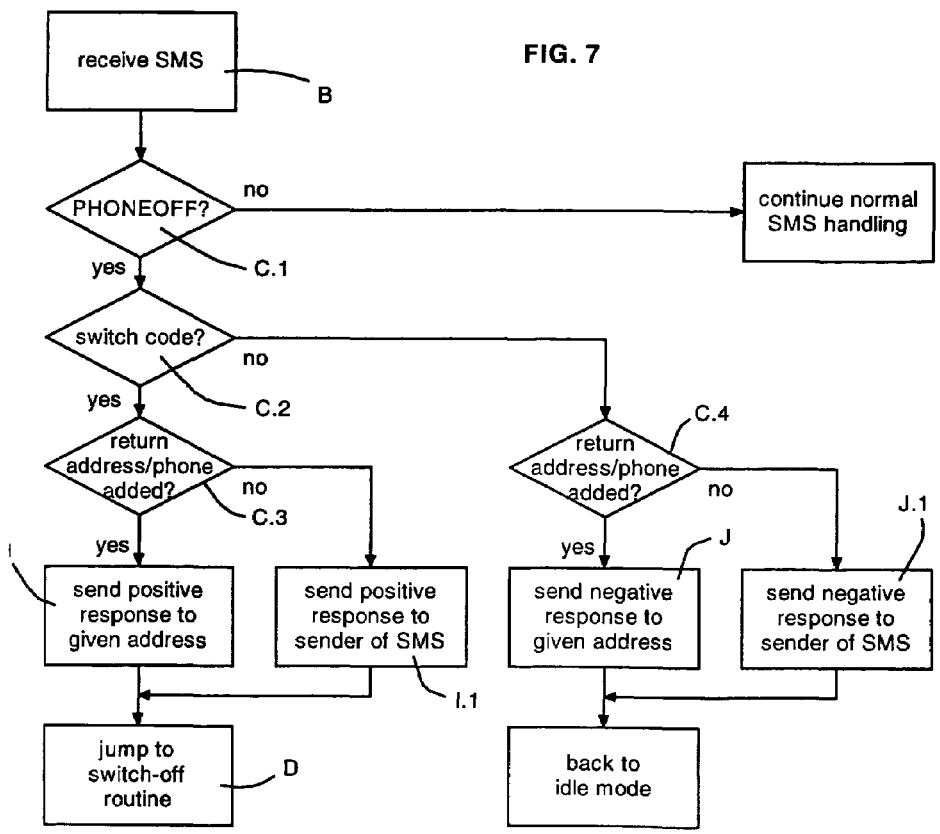
FIG. 7 is a flow chart illustrating the verification of a remote switch-off signal for switching off the mobile phone of FIG. 1.

FIG. 7 is a flow chart illustrating the verification of a remote switch-off signal received by the mobile phone 1. The remote switch-off module 14 receives (step B) the switch-off SMS SO. The remote message signal verification module 15 determines (sub-step C.1) if the remote message signal is a switch-off SMS SO.

In the case that the remote message signal is not (NO in sub-step C.1) a switch-off SMS, the processor 2 handles the SMS as a normal SMS. In the case of that the remote message signal is (YES in the sub-step C.1) a switch-off SMS SO, the remote message signal verification module 15 compares (step C.2) the second switch-off code contained in the switch-off SMS SO with the first switch-off code stored in the memory of the mobile phone 1.

If the second switch-off code is different from the first switch-off code (NO in sub-step C.2), then the response address module 17 detects (C.4) if the switch-off SMS SO contains a response telephone number or a response email address.

If the detection done by the response address module 17 is negative (NO in sub-step C.4), this response address module 17 sends (J.1) a non-switch-off confirmation message signal Q to the sender of the switch-off SMS SO via the GSM network 21, to inform him/her that the first mobile phone 1 won't be switched off.

If the detection done by the response address module 17 is positive (YES in sub-step C.4), this response address module 17 sends (J) a non-switch-off confirmation message signal Q to the response telephone number or the response email address detected via the GSM network 21 to the user, to inform him/her that the first mobile phone 1 won't be switched off. Subsequently, the remote message signal verification module 15 backs to idle mode.

If the second switch-off code is identical to the first switch-off code (YES in sub-step C.2), then the response address module 17 detects (C.3) if the switch-off SMS SO contains a response telephone number or a response email address.

If the detection done by the response address module 17 is negative (NO in sub-step C.3), this response address module 17 sends I.1) a switch-off confirmation message signal to the sender of the switch-off SMS SO.

If the detection done by the response address module 17 is positive (YES in sub-step C.3), this response address module 17 sends (I) a switch-off confirmation message signal to the response telephone number or the response email address detected, and the control jumps to the terminal switch-off module 16.

FIG. 8 illustrates a display sequence when a remote switch-off signal is received by the mobile phone 1. The display 80 can be the normal display when the mobile phone is switched on. If the mobile phone 1 receives a switch-off SMS SO, the display changes to display 81, which is shown until the phone 1 switches completely off. During the visualization of the display 81, there should be no possibility of breaking the switch-off sequence.

FIG. 9 is a flow chart illustrating the generation of a switch-off signal by means of a menu structure of the third mobile phone 20. The user must access 90 to the SMS menu structure of mobile phone 20 and select 91 the "new SMS" menu item for creating a new switch-off SMS SO. Next the user must enter the text of the switch-off SMS SO, for example, "PHONEOFF 123456" where "PHONEOFF" is the parameter for identifying the switch-off SMS and "123456" is the second switch-off code. It is possible, as it has been cited previously, to put a response telephone number or a response email address after the second switch-off code. Next the user must accept 93 the entered text and input 94 the phone number associated to the mobile phone 1 that must be switched off. Once the user has introduced the telephone number, the SMS must be sent 95 selecting the "send" menu item and later on erased 96 of the memory of the phone 20, confirming 97 its deletion. Lastly, the user must select 98 to exit the menu.

Figure 10:
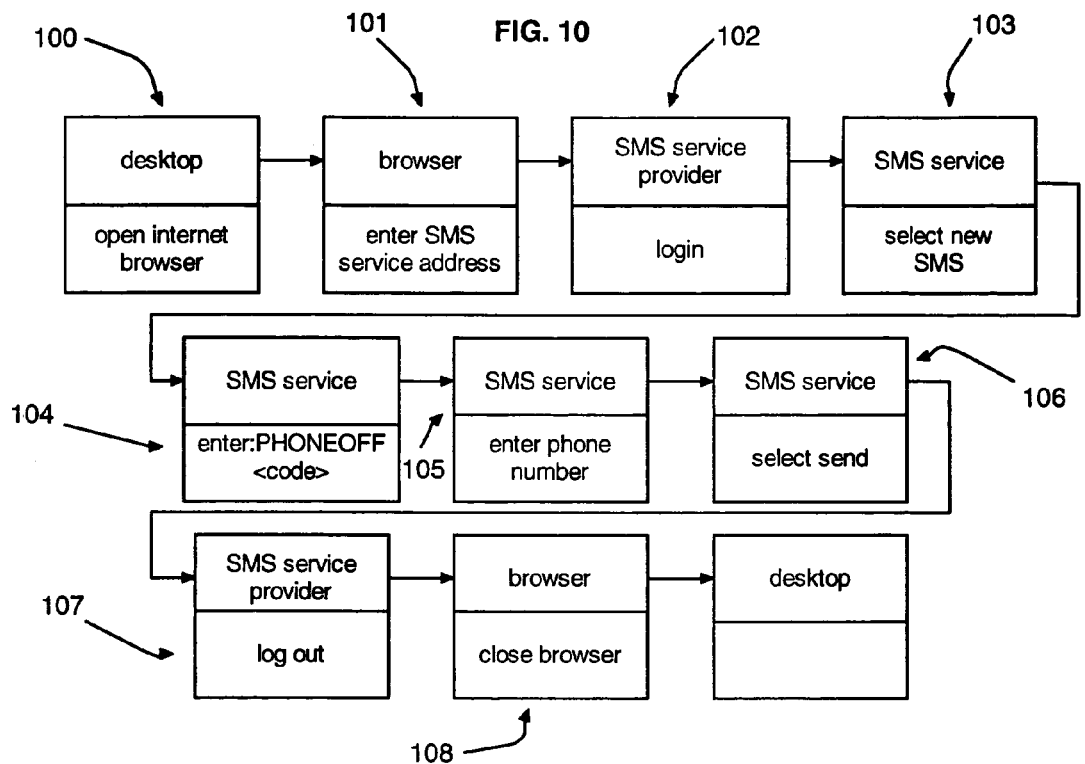
FIG. 10 is a flow chart illustrating the generation of a switch-off signal by a computer connected to Internet.

FIG. 10 is a flow chart illustrating the generation of a switch-off signal by a computer connected to Internet. The user must access 100 the desktop for opening an internet browser. In the browser, the user enters 101 a SMS service address and logins 102 into the website. When the services are available, the user selects 103 to create a new SMS and enters 104 a switch-off SMS, for example, PHONEOFF 123456 my.address@email.service.com. In this case, a switch-off SMS should always contain a response address because an email-SMS gateway normally cannot route received SMS. Next, the user enters 105 the telephone number associated to the first mobile phone 1 to be switched off and selects 106 the "send" button. To conclude, the user logs out 107 of the service and closes 108 the browser.

Figure 11:
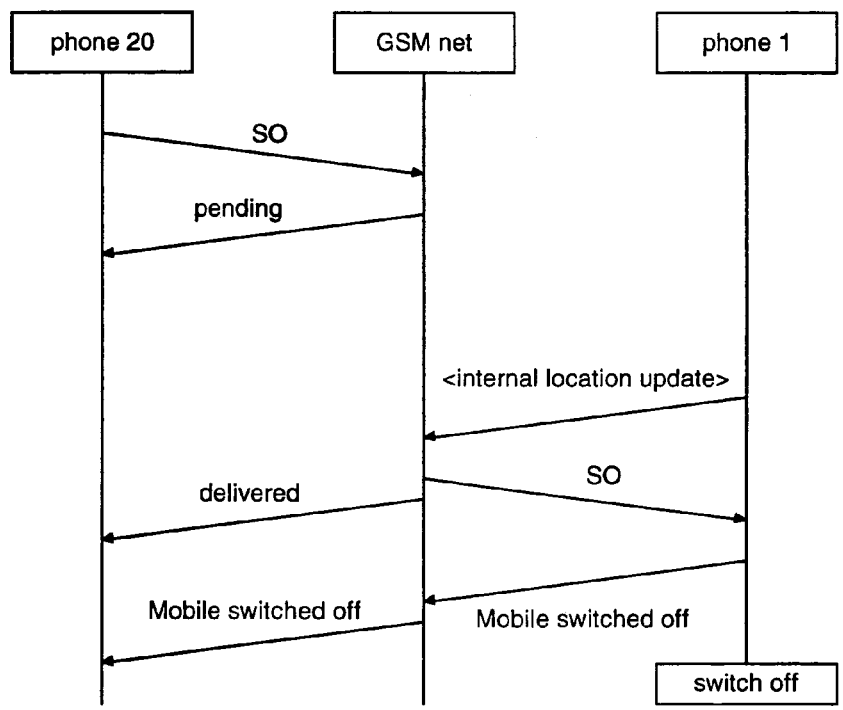
FIG. 11 illustrates the status reports that come from the wireless communication network provider.

FIG. 11 illustrates the status reports that come from the wireless communication network provider. If the user sends the switch-off SMS SO with a borrowed phone (the third mobile phone 20) he/she can get additional confirmation by the GSM network 21. Activating the delivery reports for the SMS the GSM network 21 sends a confirmation if the switch-off SMS SO is received by the GSM network and when the SMS is delivered to the first mobile phone 1 to switch it off. The additional confirmation will help recognise if the parameter for identifying a switch-off SMS (switch-off word) or the response address is misspelled. In these cases no answer is received from the first mobile phone 1, but the delivered information sent by the GSM network points to the unexpected behaviour.

According to a preferred embodiment the messages deployed are SMS messages. It is however understood than other message types such as MMS or e-mail and the like can be deployed instead.

Although the present invention has been described in detail for purpose of illustration, it is understood that such detail is solely for that purpose, and variations can be made therein by those skilled in the art without departing from the scope of the invention.

Thus, while the preferred embodiments of the mobile communication terminals and methods have been described in reference to the environment in which they were developed, they are merely illustrative of the principles of the invention. Other embodiments and configurations may be devised without departing from the scope of the appended claims.

The invention claimed is:

1. A mobile communication terminal comprising:
    a memory containing a first switch-off code of the mobile communication terminal,
    a processor unit controlling the status of the mobile terminal,
    said mobile terminal being adapted for receiving a remote switch-off signal containing a second switch-off code via the communication network, and
    the processor unit being adapted for switching off the terminal when the first switch-off code stored in the memory and the second switch-off code contained in the switch-off signal are identical.

2. A mobile communication terminal according to claim 1, wherein the terminal is provided with a control module comprising a remote switch-off module that receives the remote switch-off signal in the form of a remote message signal via the communication network from an owner of the mobile communication terminal.

3. A mobile communication terminal according to claim 2, wherein the control module comprises a terminal switch-off module, which runs a switch-off process.

4. A mobile communication terminal according to claim 2, wherein the response address module provides a switch-off confirmation message signal to the owner before the terminal switches completely off or a non-switch-off confirmation message signal to the owner if an error occurs.

5. A mobile communication terminal according to claim 4, wherein the switch-off confirmation message signal comprises a terminal EOTD location.

6. A mobile communication terminal according to claim 1, wherein the remote switch-off signal comprises:
    a parameter for identifying it as a remote switch-off signal, and
    the second switch-off code.

7. A mobile communication terminal according to claim 6, wherein the remote switch-off signal further comprises a response telephone number.

8. A mobile communication terminal according to claim 6, wherein the remote switch-off signal further comprises a response email address.

9. A mobile communication terminal according to claim 6, wherein the parameter for identifying the remote switch-off signal additionally comprises a password.

10. A mobile communication terminal according to claim 6, wherein the control module comprises a remote message signal verification module for determining if a remote message signal is a switch-off signal or a normal message signal by using the parameter for identifying the remote switch-off signal.

11. A mobile communication terminal according to claim 10, wherein the remote message signal verification module compares the first switch-off code stored in the memory and the second switch-off code contained in the switch-off signal.

12. A mobile communication terminal according to claim 11, wherein the control module comprises a response address module for detecting a response address, such as a response telephone number or a response email address, in the switch-off signal.

13. A mobile communication terminal according to claim 11, wherein the remote message signal verification module deletes the first switch-off code stored in the memory of the terminal after a predetermined number of consecutive remote switch-off signals having a second switch-off code different from the first switch-off code.

14. A mobile communication terminal according to claim 1, further comprising a menu structure for changing the switch-off code stored in the memory of the terminal.

15. A mobile communication terminal according to claim 1, further comprising a display module for displaying a terminal switch-off message.

16. A mobile communication terminal according to claim 1, wherein the remote switch-off signal is a message in Short Messaging System (SMS) format.

17. A mobile communication terminal according to claim 1, further comprising a SIM card containing a subscriber identity.

18. A mobile communication terminal according to claim 17, wherein the subscriber identity contained in the SIM card is the same subscriber identity contained in at least another SIM card.

19. A mobile communication terminal according to claim 18, wherein the processor switches off the terminal only if the remote switch-off signal is triggered by a second mobile communication terminal having a SIM card with the same subscriber identity.

20. A mobile communication terminal according to claim 1, wherein the terminal is a mobile telephone.

21. A method comprising:
    sending a remote switch-off signal via a wireless communication network to a first mobile communication terminal having a given subscriber identity associated therewith, receiving the remote switch-off signal on the first mobile communication terminal, verifying the remote switch-off signal on the first mobile communication terminal, and if the verifying the remote switch-off signal is positive then switching off the first mobile communication terminal.

22. A method according to claim 21, further comprising, before sending the remote switch-off signal, switching off a second mobile communication terminal having associated therewith the same subscriber identity as the first mobile communication terminal, and after switching off the first terminal, comprising switching on the second mobile communication terminal, and wherein in sending the remote switch-off signal the remote switch-off signal is sent from a third mobile communication terminal having associated therewith a subscriber identity different from that of the first and the second mobile communication terminals.

23. A method according to claim 21, further comprising before sending the remote switch-off signal switching off a second mobile communication terminal having associated therewith the same subscriber identity as the first mobile communication terminal, and after switching off the first mobile terminal switching on the second mobile communication terminal, and wherein when sending the remote switch-off signal, the remote switch-off signal is sent from a computer through an internet gateway.

24. A method according to claim 21, wherein the remote switch-off signal comprises:

a parameter for identifying it as a remote switch-off signal, and a second switch-off code.

25. A method according to claim 24, wherein verifying the remote switch-off signal on the first mobile terminal comprises:

recognizing said parameter for identifying a remote switch-off signal, and comparing a first switch-off code stored in a memory of the first mobile communication terminal and the second switch-off code contained in the remote switch-off signal.

26. A method according to claim 21, further comprising, if verifying the remote switch-off signal on the first mobile terminal is positive, sending a switch off confirmation message signal before the terminal switches completely off.

27. A method according to claim 21, further comprising, if verifying the remote switch-off signal on the first mobile terminal is negative, sending a non-switch-off confirmation message signal.

28. A method according to claim 21, wherein the remote switch-off signal comprises a response telephone number and wherein verifying the remote switch-off signal on the first mobile terminal further comprises a sub-step (C.3; C.4) comprising detecting the response telephone number.

29. A method according to claim 21, wherein the remote switch-off signal comprises a response email address and wherein verifying the remote switch-off signal on the first mobile terminal further comprises detecting the response email address.

30. A method comprising:

calling a predetermined telephone number of a wireless communication network provider from a second mobile communication terminal if the network provider verifies that a first mobile communication terminal with a given subscriber identity is switched on, the subscriber identity of the first mobile communication terminal is the same as a subscriber identity of the second terminal, cause said network provider to verify if the first mobile communication terminal is switched on, causing said network provider to send a remote switch-off signal to the first mobile communication terminal, and remotely switching off the first mobile communication terminal upon receipt of the remote switch-off signal.

31. A method according to claim 30, further comprising between calling the predetermined telephone number and causing said network provider to verify if the first mobile communication terminal is switched on, switching off the second mobile communication terminal for a period of time.

32. A method according to claim 30, further comprising between calling the predetermined telephone number and causing said network provider to verify if the first mobile communication terminal is switched on, storing a unique code associated with the second mobile communication terminal and wherein the step of causing said network provider to verify if the first mobile communication terminal is switched on comprises:

updating the first mobile communication terminal in the wireless communication terminal, obtaining the subscriber identity and a unique code of the first mobile communication terminal, and recognizing that the first mobile communication terminal has the same subscriber identity but different unique code that the second mobile communication terminal.

33. A method according to claim 30, wherein the unique code is the IMEI.

* * * * *